United States Patent [19]
Neff et al.

[11] Patent Number: 5,257,722
[45] Date of Patent: Nov. 2, 1993

[54] DEVICE FOR FILLING ONE OR MORE MOLDS WITH FLOWABLE MATERIALS

[75] Inventors: Gerd Neff, Sinn-Fleisbach; Erhard Haeuser, Schoeffengrund, both of Fed. Rep. of Germany

[73] Assignee: Wilhelm Hedrich Vakuumanlagen GmbH & Co. KG, Ehringshausen-Katzenfurt, Fed. Rep. of Germany

[21] Appl. No.: 854,720

[22] Filed: Mar. 23, 1992

[30] Foreign Application Priority Data

Apr. 3, 1991 [DE] Fed. Rep. of Germany ....... 9103989
Jul. 26, 1991 [DE] Fed. Rep. of Germany ....... 9109259

[51] Int. Cl.⁵ .............................................. B67D 5/52
[52] U.S. Cl. ..................................... 222/137; 222/485
[58] Field of Search ............... 222/135, 137, 255, 265, 222/270, 276, 484, 485, 409, 280; 417/489, 521; 264/328.6

[56] References Cited

U.S. PATENT DOCUMENTS 3,773,300 11/1973 Hauser .............................. 222/135
4,279,360 7/1981 Hauser .............................. 222/135

FOREIGN PATENT DOCUMENTS 3740857 6/1989 Fed. Rep. of Germany ...... 222/137

*Primary Examiner*—Andres Kashnikow
*Assistant Examiner*—Philippe Derakshani
*Attorney, Agent, or Firm*—Flynn, Thiel, Boutell & Tanis

[57] ABSTRACT

A device for filling one or more molds with flowable materials. The device includes several storage tanks (1) for the respective individual components, with each storage tank (1) being connected to one or more flow mixers (4) through a pump mechanism (2) and at least one valve mechanism (3), the casting port (5) of which flow mixers is connected to a mold (6). In order to enable both short inlet paths of the individual synthetic resin components and also a precise, uniform supply of the components to the flow mixers (4), the invention provides that the storage tank (1) and the pump mechanism (2) are combined into one structural unit.

12 Claims, 3 Drawing Sheets

DEVICE FOR FILLING ONE OR MORE MOLDS WITH FLOWABLE MATERIALS

FIELD OF THE INVENTION

The invention relates to a device for filling one or more molds with flowable materials. The device includes several storage tanks for the respective individual components, in particular for quickly hardening casting masses, with each storage tank being connected to one or more flow mixers through a pump mechanism and at least one valve mechanism, the flow mixers each having a casting port which is connected to a mold, and the storage tank and the pump mechanism being combined into one structural unit.

BACKGROUND OF THE INVENTION

To manufacture synthetic resin articles in molds, it is necessary to mix the individual components in precisely measured volumes directly preceding the casting operation and to move same into the mold. The difficulty resulting hereby is that the available time span between the feeding of the components from the storage tanks to the flow mixer and the pouring of the casting masses into the mold must be very short in order to prevent an undesired hardening of the synthetic resin mass. Furthermore, it must be assured that at all times precise amounts of the individual components are mixed in order to produce the desired synthetic resin mass. DE-OS 27 48 982 describes a device in which the individual components are guided from the storage tanks into the molds through a mixer by means of synchronously driven pumps.

Gebrauchsmuster application G 91 03 989.4 suggests, in particular for minimizing the casting mass volume in the mixing and pipeline area, to connect the individual pumps associated with the storage tanks by means of a synchronous dosing mechanism and to arrange blockable valves in the supply pipelines. This design has advantages compared with the state of the art, however, the equipment expense is relatively high so that higher manufacturing and servicing costs result.

SUMMARY OF THE INVENTION

The basic purpose of the invention is to provide a device of the above-mentioned type which at a minimum of casting mass volume in the mixing and pipeline area and at a high casting pipeline makes available exactly dosed individual components, and which with a simple design and simple, inexpensive manufacturing capability offers a high degree of operating reliability.

The purpose is attained according to the invention by the pump mechanism including several pump pistons which each can be introduced into a cylinder, the inlet of which to the storage tank is open for filling the cylinder, with each cylinder being connected to a flow mixer through an outlet, and by the pump pistons having a common drive and being able to be moved synchronously in the cylinders.

The device of the invention is distinguished by a number of significant advantages. One significant advantage is that the pump mechanism of the invention is directly associated with the storage tank so that the expenditure for the dosing mechanisms is significantly reduced. The danger of a reaction or a jelling in the area of the mixer and/or the pipelines is thus reduced. The device of the invention can thus be utilized in particular for quickly hardening casting masses. It is thereby particularly advantageous that, due to the inventive construction and arrangement of the dosing pumps and flow mixers, the active casting mass has only a very small volume.

The pump mechanism is advantageously arranged in the storage tank. As an alternative it is, however, also advantageous when the pump mechanism is arranged at the outlet of the storage tank. The component in the storage tank flows in both cases directly into the pump without separate pipeline paths being needed.

The pump mechanism of the invention includes several pump pistons, each of which can be introduced into a cylinder, the inlet of which is open to the storage tank, with each cylinder being connected through an outlet to a flow mixer. Since usually several molds are to be filled simultaneously, it is necessary to feed exactly the predetermined amount of individual components to be mixed to each mold or rather to the respective flow mixer associated with the respective mold. This is guaranteed by the described design of the pump mechanism, since an exactly dosed, predeterminable amount of the respective component is conveyed by the pump piston.

In order to design the pump mechanism compact and simple, it is provided that several parallel pump pistons of the same dimensions are connected by a common crossbar and can be moved simultaneously into the cylinders. Thus only one single drive mechanism is needed in order to move in a precise manner exact amounts of the respective components through the outlet pipelines of the individual cylinders.

An alternative, particularly advantageous embodiment provides that the pump mechanism includes a stepped piston with several cylindrical sections, each of which successively have a larger diameter, and a stepped cylinder which has cylinder areas of different diameter, which areas fit with the stepped piston. Each cylinder area has an outlet connected to the respective flow mixer. This embodiment is particularly advantageous because by moving only one single piston the respective amounts can be moved out through the different outlet pipelines. At the same time a quick and even filling of the cylinders is assured since a sufficient feed cross section exists when the stepped piston is pulled back. It is advantageous according to the invention when the cylindrical sections, starting at the free end of the stepped piston, each have a larger diameter so that as a whole a stepped form of the stepped piston results. The individual cylindrical sections or rather the associated cylinder areas can, with reference to the working stroke of the stepped piston, have the same or also different working volumes.

A further important advantage of the stepped piston is that only the last cylindrical section remote from the free end and the associated cylinder area must have a sealed and sliding fit relationship in order to seal off the cylinder toward the inside of the storage tank during the working stroke. The differential pressure is practically equal to zero between each of the further cylindrical sections of the stepped piston and the associated cylinder areas, so that, due to the not existing pressure difference, the differential piston can have a greater play or clearance in these areas. This significantly simplifies the manufacture of the stepped piston.

The individual pump mechanisms can according to the invention be mechanically or hydraulically coupled with one another in order to synchronously supply from each of the individual storage tanks equal amounts of synthetic resin components. While the coupling can be hydraulic, it is also possible to provide and to electrically couple the respective pump mechanisms with a separate electric drive.

BRIEF DESCRIPTION OF THE DRAWINGS

The invention will be described hereinafter in connection with exemplary embodiments and the drawings, in which.

DETAILED DESCRIPTION

Figure 1:
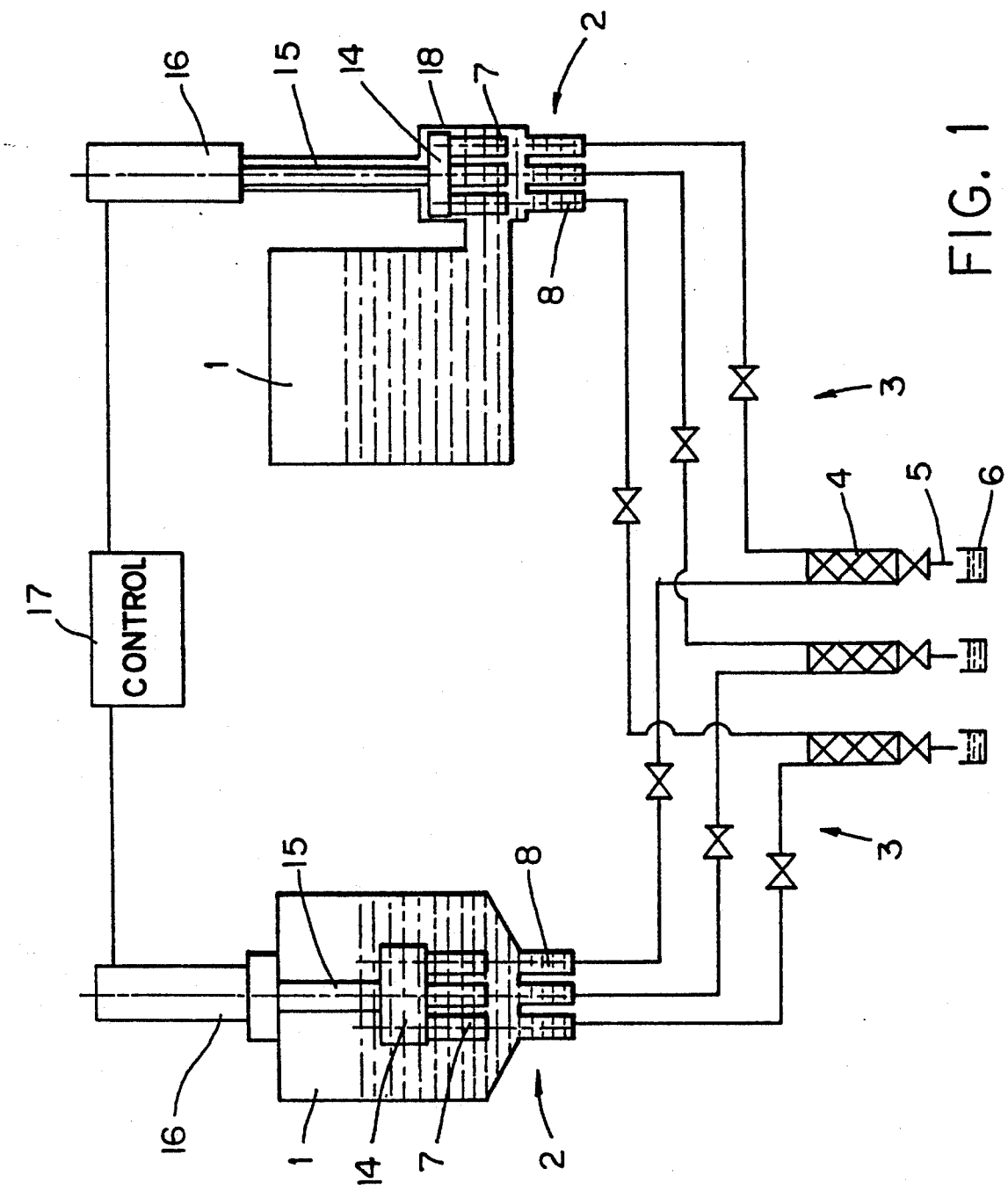
FIG. 1 is a schematic illustration of the device of the invention showing two storage tanks each with associated pump mechanisms and a total of three flow mixers.

The device illustrated in FIG. 1 includes two storage tanks 1, each of which have a separate pump mechanism 2 as will be discussed later on. Individual components are in the storage tanks 1, which components can be fed through the illustrated pipelines to three flow mixers 4 by means of the pump mechanisms 2. Each of the flow mixers 4 has a casting port 5 terminating in an associated mold 6. A valve mechanism 3 exists in the area of the pipelines between the pump mechanisms 2 and the flow mixers 4.

Figure 3:
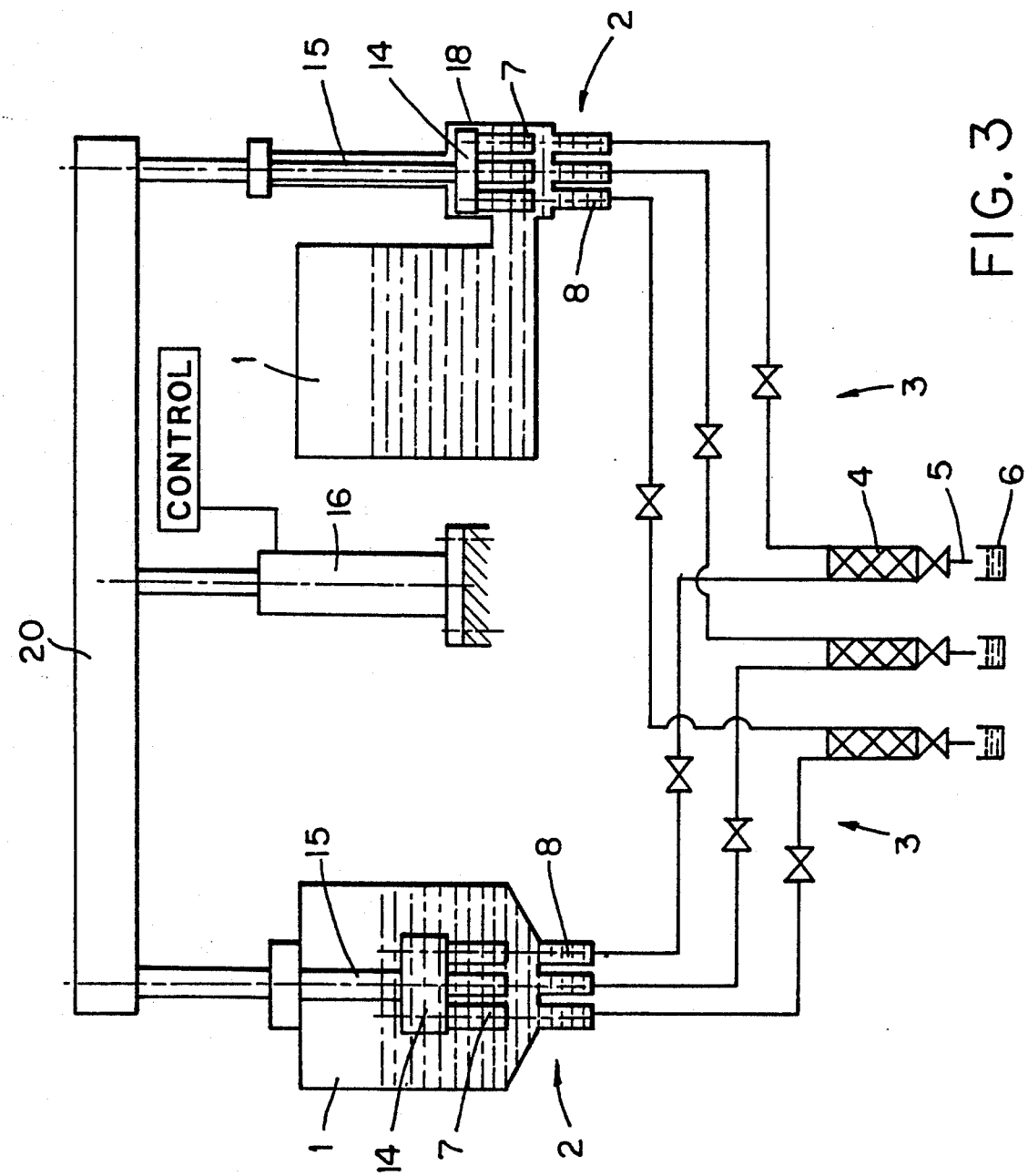
FIG. 3 illustrates a single drive for plural pump mechanisms.

FIG. 1 shows two different modified embodiments, the left pump mechanism 2 being directly integrated in the left storage tank 1. Both pumps include three pump pistons 7 which are parallel with one another and which are connected by a crossbar 14. A piston rod 15 is connected to each crossbar 14 and is connected to a drive 16. The two drives 16, which can be of any convenient variety, such as hydraulic cylinder units and/or electric servomotors, are synchronized with one another by a control 17. In the alternative, a single drive 16 can be utilized when the rods 15 are mechanically connected as by a crossbeam 20 as shown in FIG. 3.

The exemplary embodiment illustrated in the left half of the drawing of FIG. 1 has three cylinders constructed at the lower area of the storage tank 1. The pump pistons 7 can be moved into these cylinders. Each of the cylinders 8 has an outlet at its lower end, which outlet ends in a pipeline, each of which has a valve and terminates at the respective flow mixer 4.

FIG. 1 shows on the right half a further exemplary embodiment in which the pump mechanism 2 is arranged in the outlet area of the storage tank 1 in a pump chamber 8. The pump pistons 7 and the cylinders 8 correspond otherwise with the exemplary embodiment of the left half of FIG. 1. The outlets of the cylinders 8 are here also directly connected to the flow mixers 4 through pipelines having valves. Thus by operating the two drives 16, the pump pistons 7 can each be moved synchronously in the cylinders 8 in order to feed exactly adjusted, equal amounts of components to the flow mixers 4 so as to facilitate an injection of these amounts through their respective casting ports into the molds 6.

Figure 2:
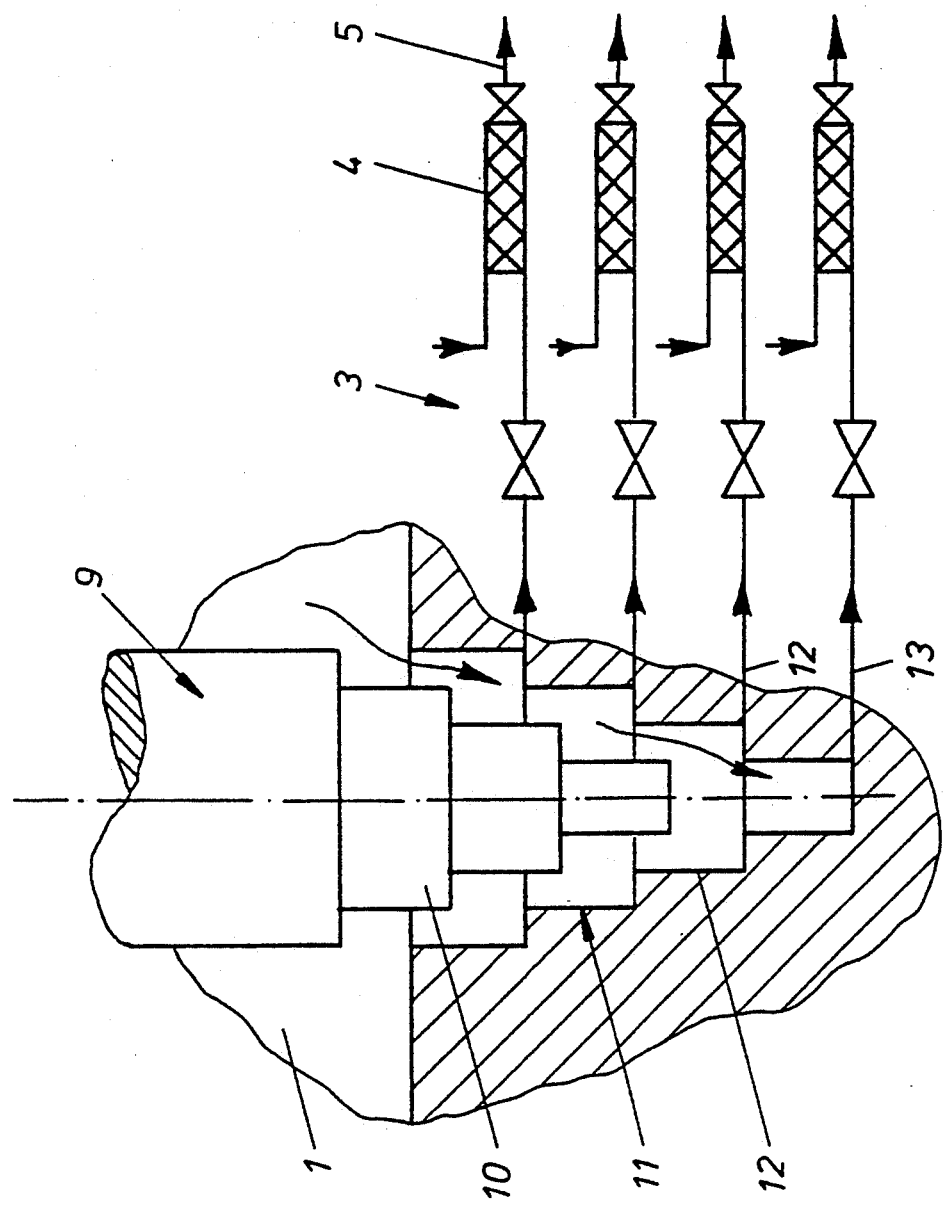
FIG. 2 illustrates a further exemplary embodiment of the pump mechanism of the invention using a stepped piston to feed synthetic resin components to a total of four flow mixers.

FIG. 2 shows an alternative exemplary embodiment of the pump mechanism 2 using a stepped piston 9 including several cylindrical sections 10, each of which, starting at the free end of the stepped piston 9, have a larger, increasing diameter. Fitting with this, a stepped cylinder 11 is provided which has individual cylinder areas 12, which also have an increasing diameter. Each of the cylinder areas 12 has an outlet 13 terminating in a pipeline connected directly to the flow mixer 4 through a valve of the valve mechanism 3. FIG. 2 shows all together four such flow mixers 4. The pump mechanism for injecting the second synthetic resin components into the flow mixer 4 is not shown, it can also be designed like a stepped piston 9.

The invention is not to be limited to the illustrated exemplary embodiments, rather many possibilities for modifications exist within the scope of the invention for a man skilled in the art.

In conclusion the following can be stated:

The invention relates to a device for filling of one or more molds with flowable materials, comprising several storage tanks (1) for the respective individual components, with each storage tank (1) being connected to one or more flow mixers (4) through a pump mechanism (2) and at least one valve mechanism (3), the casting port (5) of which flow mixers is connected to a mold (6). In order to enable both short inlet paths of the individual synthetic resin components and to achieve also a precise, uniform supply of the components to the flow mixers, the invention provides that the storage tank (1) and the pump mechanism (2) are combined into one structural unit and each pump mechanism (2) includes several pump pistons (7) which have a common drive. (FIG. 1).

The embodiments of the invention in which an exclusive property or privilege is claimed are defined as follows:

1. In a device for filling one or more molds with a flowable material, comprising at least one storage tank for the flowable material, said storage tank being connected to one or more flow mixers through a pump mechanism and at least one valve mechanism, each of said flow mixers having a casting port, each of said casting ports being connected to a mold, said storage tank and said pump mechanism being combined into one structural unit, the improvement wherein said pump mechanism includes several pump pistons each of which are introduced into a separate cylinder, an inlet end of each of said cylinders being open toward said storage tank for allowing the flowable material to flow into and fill each of said cylinders, each of said cylinders being separately connected through said at least one valve to said flow mixer, and wherein drive means are provided for synchronously driving said pump pistons into and out of said cylinders.

2. The device according to claim 1, wherein said pump mechanism is arranged inside said storage tank.

3. The device according to claim 1, wherein said pump mechanism is arranged at an outlet of said storage tank.

4. The device according to claim 1, wherein said pump pistons are connected by a common crossbar.

5. The device according to claim 4, wherein said valve is arranged between each cylinder and an associated flow mixer.

6. The device according to claim 1, wherein said pump mechanism includes a stepped piston with several cylindrical sections each having a successively larger diameter, and a stepped cylinder with successively larger cylinder areas of different diameter each fitting with a corresponding section of said stepped piston, each cylinder area having an outlet port connected to a respective flow mixer.

7. The device according to claim 6, wherein said cylindrical sections, starting at a distal end of said stepped piston, each have a larger diameter.

8. The device according to claim 7, wherein each cylindrical section and associated cylinder area has, in relationship to a working stroke of said stepped piston, the same working volume.

9. The device according to claim 6, wherein a cylindrical section remote from said distal end of said stepped piston and an associated cylinder area have a sealed and sliding fit relationship, while the remaining cylindrical sections and cylinder areas each have a clearance therebetween to reduce a pressure differential between the remaining cylindrical sections and cylindrical areas.

10. The device according to claim 1, wherein said pump mechanisms are mechanically coupled, and wherein said drive means drives said mechanically coupled connected to effect said synchronous driving of said pump mechanisms.

11. The device according to claim 1, wherein said drive means includes means for hydraulically driving said pump mechanisms.

12. The device according to claim 1, wherein said drive means includes means for electrically driving said pump mechanisms.

* * * * *

UNITED STATES PATENT AND TRADEMARK OFFICE
CERTIFICATE OF CORRECTION

PATENT NO. : 5 257 722

DATED : November 2, 1993

INVENTOR(S) : Gerd NEFF et al.

It is certified that error appears in the above-identified patent and that said Letters Patent is hereby corrected as shown below:

Column 6, line 6; change "connected" to ---connection---.

Signed and Sealed this

Nineteenth Day of April, 1994

Attest:

BRUCE LEHMAN

Attesting Officer   Commissioner of Patents and Trademarks